US012382314B1

(12) United States Patent
Murphy et al.

(10) Patent No.: US 12,382,314 B1
(45) Date of Patent: Aug. 5, 2025

(54) APPARATUS AND METHOD FOR COMMUNICATION CHANNEL CONFIGURATION

(71) Applicant: Boostly, Inc., Lehi, UT (US)

(72) Inventors: Shane Murphy, Saratoga Springs, UT (US); Michael Murphy, Pleasant Grove, UT (US)

(73) Assignee: Boostly, Inc., Lehi, UT (US)

( * ) Notice: Subject to any disclaimer, the term of this patent is extended or adjusted under 35 U.S.C. 154(b) by 0 days.

(21) Appl. No.: 19/035,294

(22) Filed: Jan. 23, 2025

(51) Int. Cl.
*H04W 24/02* (2009.01)
*H04W 72/04* (2023.01)

(52) U.S. Cl.
CPC .......... *H04W 24/02* (2013.01); *H04W 72/04* (2013.01)

(58) Field of Classification Search
CPC ..... H04W 24/02; H04W 72/04; H04W 76/00; H04W 4/50; H04W 76/10; H04W 76/11; H04W 74/00; H04W 88/02; H04W 74/0866; H04W 72/02; H04W 72/20; H04W 72/231; H04W 74/002; H04W 88/00; H04W 76/19; H04W 88/08; G06N 20/00; G06N 20/20; H01M 8/0247; H01M 8/0258; H04M 1/72505; H04M 1/72508; H04M 1/72511; H04M 3/514; H04M 3/5175; H04M 3/5183; H04M 5/04
See application file for complete search history.

(56) References Cited

U.S. PATENT DOCUMENTS

| 8,233,925 | B1  | 7/2012 | Boyle et al. |     |
|-----------|-----|--------|--------------|-----|
| 2007/0055777 | A1* | 3/2007 | Lowrence et al. | 709/226 |
| 2011/0179126 | A1* | 7/2011 | Wetherell et al. | 709/206 |
| 2012/0005026 | A1  | 1/2012 | Khan et al. |     |
| 2014/0032259 | A1  | 1/2014 | LaFever et al. |     |

(Continued)

FOREIGN PATENT DOCUMENTS

JP         2003345968 A       12/2003

OTHER PUBLICATIONS (KR 20220117697) A Method for Providing Services (see title) (Year: 2022).*

(Continued)

*Primary Examiner* — Meless N Zewdu
(74) *Attorney, Agent, or Firm* — Caldwell Intellectual Property Law

(57) ABSTRACT

An apparatus for communication channel configuration, the apparatus including at least a processor, and a memory communicatively connected to the at least a processor. Wherein the apparatus is configured to receive a plurality of recipient data from an external system, parse the plurality of recipient data into a recipient profile, and determine a communication channel configuration for the recipient. Wherein parsing the plurality of recipient data into a recipient profile includes extracting a selected recipient dataset from the plurality of recipient data, storing the selected recipient dataset in a recipient database, and verifying the selected recipient dataset as a function of recipient contact data. Further, wherein determining a communication channel configuration for the recipient includes querying one or more recipient systems associated with the recipient profile, receiving a response signal, and updating the communication channel configuration of the recipient profile as a function of the response signal.

20 Claims, 7 Drawing Sheets

(56) References Cited

U.S. PATENT DOCUMENTS

| | | | |
|---|---|---|---|
| 2018/0205491 A1* | 7/2018 | Yu et al. ............... | H04L 1/0041 |
| 2020/0099788 A1* | 3/2020 | de Abreu Resenes et al. ............. | |
| | | | H04M 3/5183 |
| 2024/0303729 A1* | 9/2024 | Dhawad et al. ....... | G06Q 40/03 |

OTHER PUBLICATIONS (KR 20220117694 A) An Apparatus and a Method for Providing Chatting Contents Services Based on Group Calling Channels (see title and claim 1) (Year: 2022).*

(DE 202005014968 U1) Wireless Transceiver and Integrated Circuit for Switching Channel Configurations for a Radio Bearer (see title) (Year: 2005).*

(R 102715667 B1), published on Oct. 11, 2024, discloses—Multi-channel Messaging Device (see title and Description) (Year: 2024).*

* cited by examiner

APPARATUS AND METHOD FOR COMMUNICATION CHANNEL CONFIGURATION

FIELD OF THE INVENTION

The present invention generally relates to the field of data acquisition and analysis. In particular, the present invention is directed to apparatuses and methods for communication channel configuration.

BACKGROUND

Automated determination of a communication channel configuration for a recipient can be challenging for automated communication systems. It is often unclear what communication channel a recipient prefers. Additionally, verification of communication information can be challenging. Recipient data may also be spread out across many non-interfacing external systems.

SUMMARY OF THE DISCLOSURE

In an aspect an apparatus for communication channel configuration may include at least a processor and a memory communicatively connected to the at least a processor. The apparatus is configured to receive a plurality of recipient data from an external system, parse the plurality of recipient data into a recipient profile, and determine a communication channel configuration for the recipient. Wherein parsing the plurality of recipient data into a recipient profile includes extracting a selected recipient dataset from the plurality of recipient data, storing the selected recipient dataset in a recipient database, and verifying the recipient data as a function of recipient contact data. Further, wherein determining a communication channel configuration for the recipient includes querying one or more recipient systems associated with the recipient profile, receiving a response signal, and updating the communication channel configuration of the recipient profile as a function of the response signal.

In another aspect a method for communication channel configuration may include receiving a plurality of recipient data from an external system, parsing the plurality of recipient data into a recipient profile, and determining a communication channel configuration for the recipient. Wherein parsing the plurality of recipient data into a recipient profile includes extracting a selected recipient dataset from the plurality of recipient data, storing the selected recipient dataset in a recipient database, and verifying the recipient data as a function of recipient contact data. Further, wherein determining a communication channel configuration for the recipient includes querying one or more recipient systems associated with the recipient profile, receiving a response signal, and updating the communication channel configuration of the recipient profile as a function of the response signal.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for communication channel configuration. In an embodiment, an apparatus for communication channel configuration may include at least a processor and a memory communicatively connected to the at least a processor. The apparatus may be configured to receive a plurality of recipient data from an external system, parse the plurality of recipient data into a recipient profile, and determine a communication channel configuration for the recipient. Wherein parsing the plurality of recipient data into a recipient profile may further include extracting a selected recipient dataset from the plurality of recipient data, storing the selected recipient dataset in a recipient database, and verifying the recipient data as a function of recipient contact data. Further, wherein determining a communication channel configuration for the recipient may include querying one or more recipient systems associated with the recipient profile, receiving a response signal, and updating the communication channel configuration of the recipient profile as a function of the response signal.

Aspects of the present disclosure can be used to configure a communication channel. Aspects of the present disclosure can also be used to assist in determining the best form of communication with a given client. This is so, at least in part, because the apparatus and method disclosed within provide an advantageous database building functionality. This may result in comprehensive customer contact data acquisition and opt-in management functionalities, as well as other data management functionalities. Exemplary embodiments illustrating aspects of the present disclosure are described below in the context of several specific examples.

Figure 1:
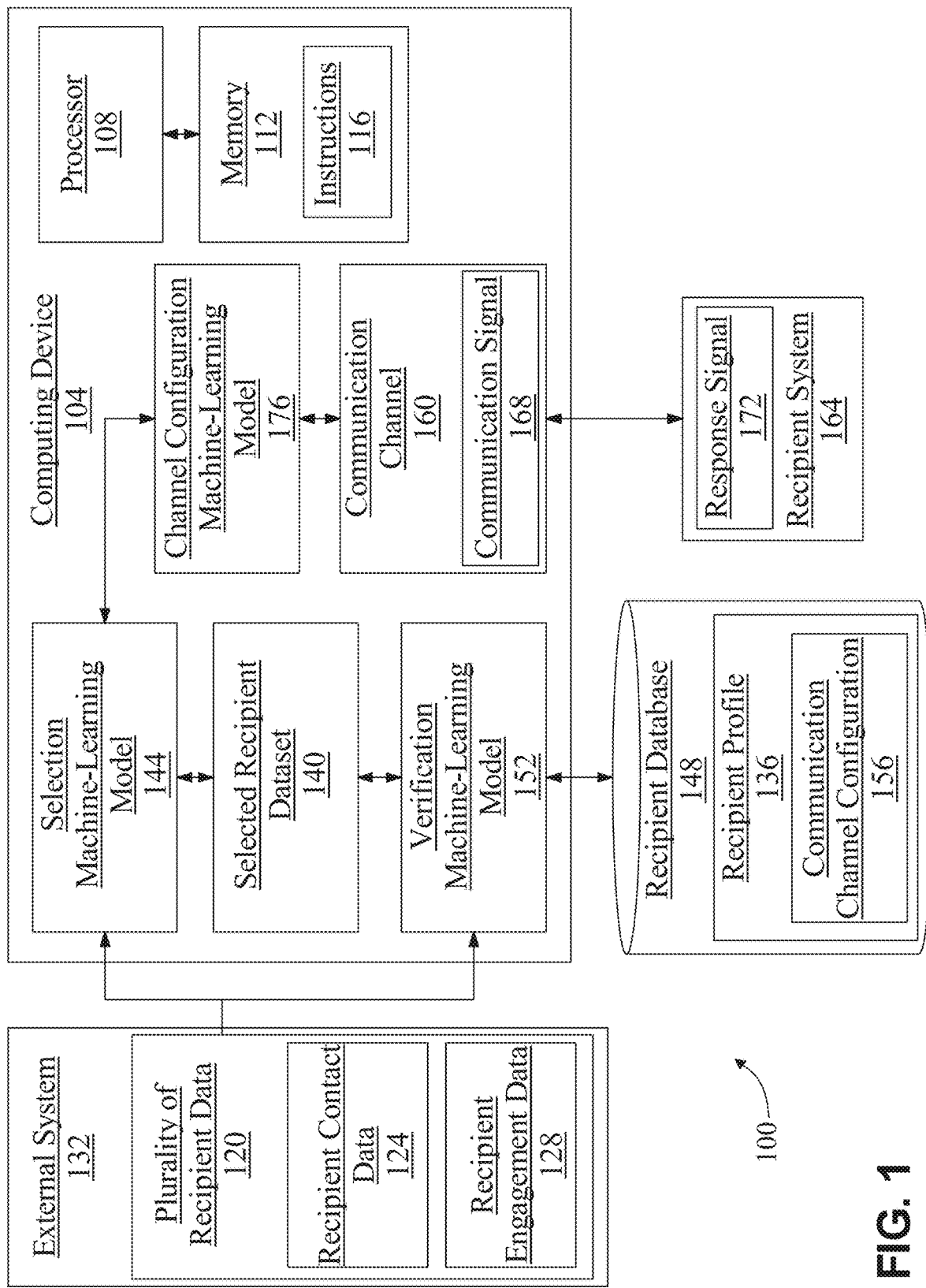
FIG. 1 is a block diagram of an exemplary embodiment of an apparatus for communication channel configuration.

Referring now to FIG. 1, an exemplary embodiment of an apparatus 100 for communication channel configuration is illustrated. Apparatus 100 includes at least a processor 108 and a memory 112 communicatively connected to at least a processor 108. Memory 112 contains instructions 116 configuring at least a processor 108 to receive a plurality of recipient data 120 from an external system 132, parse plurality of recipient data 120 into a recipient profile 136, and determine a communication channel configuration 156 for the recipient profile 136. Wherein, parsing plurality of recipient data 120 into recipient profile 136 includes extracting a selected recipient dataset 140 from plurality of recipient data 120, storing selected recipient dataset 140 in a recipient database 148, and verifying recipient data as a function of recipient contact data 124. Furthermore, wherein determining a communication channel configuration 156 for recipient profile 136 includes querying, using a communication channel 160, one or more recipient systems 164 associated with recipient profile 136, receiving a response signal 172 using communication channel 160, and updating communication channel configuration 156 of recipient profile 136 as a function of response signal 172.

With continued reference to FIG. 1, apparatus 100 includes a computing device 104. Computing device 104 includes a processor 108 communicatively connected to a memory 112. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to reference FIG. 1, at least a processor 108 may be configured to receive plurality of recipient data 120 from external system 132. As used throughout this disclosure, "recipient" refers to an intended receiver of information in communication. A recipient may include an individual and/or an entity. "Recipient data" refers to information specifically related to individuals or entities that are intended to receive messages, products, or services. For example, and without limitation recipient data may include details such as names, contact information, preferences, demographics, and/or any other relevant data that may assist in identifying and/or reaching the intended recipient effectively. In some embodiments, plurality of recipient data 120 may be received from a digital file. For example, in some embodiments, plurality of recipient data 120 may be imported using a csv file, excel file, word document, or the like. Plurality of recipient data 120 may include but is not limited to recipient contact data 124 and/or recipient engagement data 128. "Recipient contact data" is data associated with details that may allow someone to reach or communicate with a person and/or an entity. For example, and without limitation, recipient contact data 124 may include names, phone numbers, email addresses, mailing addresses, websites, internet handles, and/or metadata associated therewithin. Further, "recipient engagement data" is data associated with metrics and/or information that track how a recipient interacts with content, products, and/or services. In some embodiments, "engagement data" may be alternatively referred to as "interaction data." In some embodiments, "recipient interaction data" may be alternatively referred to as "recipient interaction data." Content refers to any information and/or experience created and shared for a specific audience. In an embodiment content may include text, images, audio, video, interactive elements, and/or any combination thereof. For example, content may include articles, blogs, books, reports, photographs, graphics, infographics, illustrations, podcasts, music, sound recordings, films, vlogs, tutorials, live streams, quizzes, polls, games, and/or the like. Recipient engagement data 128 may assist in understanding preferences, patterns, and overall engagement levels. For example, recipient engagement data 128 may include clicks, views, time spent, comments and shares, likes and reactions, conversion rates, order content, and/or metadata associated therewithin. Clicks may include the number of times a recipient clicks on a given link, button, and/or ad. Views may include the number of times any given content, such as articles, videos, menus, catalogs and/or the like are viewed and for how long. Time spent may include the duration a recipient spent interacting with content or a platform. Comments and shares may include recipient-generated interactions that indicate interest, approval, and/or disapproval. Likes and reactions may include simple indicators of approval and/or enjoyment of a given content. Conversion rates may include the percentage of recipients who take a desired action, for example, and without limitation, such as signing up or making a purchase. Order content may include order history, what was ordered, when it was ordered, including timestamps, amount spent, and/or the like.

With continued reference to FIG. 1, in an embodiment, external system 132 may include one or more systems. External system 132 may include any system used in tracking, storing, analyzing, and/or synthesizing information. For example, and without limitation, external system 132 may include point of sale (POS) systems, reservation/booking systems, delivery systems, external databases, and/or the like and/or in combination. "POS systems" are digital solutions utilized to manage sales transactions. POS systems may combine hardware and software to facilitate the checkout process, track sales, manage inventory, and/or process payment. These systems are widely used in retail stores, restaurants, and other service industries, helping businesses streamline operations and improve customer experience. In an embodiment, as non-limiting examples, POS system may include systems by TOAST, SQUARE, SHOPIFY, CLOVER, LIGHTSPEED, REVEL SYSTEMS, NCR SILVER, VEND, SHOPKEEP, and/or QUICKBOOKS. POS systems and/or external systems 132 may provide a variety of recipient data 120, such as, and without limitation, sales data, customer data, inventory data, payment data, employee data, time and date stamps, discounts and promotions, returns and exchanges, sales tax data, and/or customer feedback. Sales data may include details of each transaction, including items sold, quantities, prices, total sales, and analysis of said data. Customer data may include information about customers, such as names, contact details, purchase history, and/or loyalty program participation. Inventory data may include stock levels, product movement, reorder points, and/or supplier information. Payment data may include types of payment used, such as cash, credit, debit card, mobile payments, and/or the like, and transaction details. Employee data may include sales performance by staff members, timekeeping information, and/or commission tracking. Time and date stamps may include when transactions occur, which may assist in identifying peak hours and trends. Discounts and promotions may include information on applied discounts, promotions, and their effectiveness. Returns and exchanges may include data on returned items, reasons for returns, and/or impact on sales. Sales tax data may include information on applicable sales taxes for each transaction. Whereas, customer feedback may include reviews and/or ratings collected at the POS and/or external system 132, often through surveys and/or loyalty programs.

With further reference to FIG. 1, in some embodiments receiving plurality of recipient data 120 from external system 132 may further include querying external system 132 for records from a selected temporal interval. Wherein the selected temporal interval may be chosen based on a set criterion. For the purposes of this disclosure, "querying" is the act of requesting or obtaining information from an informational system. In some embodiments, querying may be a manual experience. In some embodiments, querying may be programmatic; for example in some embodiments, processor may generate a database query to retrieve information from a database or informational system. Set criteria may be based on a temporal interval of interest, manually chosen, and/or determined based on previous analysis of a given dataset. For example, and without limitation, a selected temporal interval may be set to a certain lookback period of the last 18-24 months. Further, set criteria may place limitations on the temporal interval, setting a lookback period with a start and an end date. For example, and without limitation, querying external system 132 for records from Jun. 12, 2023, to Jun. 12, 2024. Apparatus 100 may have these parameters built in and/or be configured to be adjusted based on preference and/or need. Further, in an embodiment, a selected temporal interval may receive plurality of recipient data 120 from last week, last month, the last 3 months, the last 6 months, the last year, and/or the last 2 years. The selected temporal interval may be based on specific targeting aspects that align with the goal of a given campaign.

Continuing to reference FIG. 1, in an embodiment, receiving plurality of recipient data 120 from external system 132 may further include receiving plurality of recipient data 120 using a web-crawler. A web-crawler may also be referenced to as a spider or bot and is an automated program that systematically browses the internet collecting data from websites for the purpose of web indexing. A "web-crawler," for the purposes of this disclosure, is a software program that is configured to systematically browse the internet or documents to index and/or collect data. Web-crawlers may collect any embodiment of plurality of recipient data 120 as described throughout this disclosure. The web-crawler may be seeded with platform URLs, wherein the crawler may then visit the next related URL, retrieve the content, index the content, and/or measure the relevance of the content to the topic of interest. In some embodiments, processor 108 may generate a web-crawler to compile plurality of recipient data 120, user dataset. The web-crawler may be seeded and/or trained with a reputable website, such as a website affiliated with recipient contact data 124, to begin the search. In some embodiments, the web-crawler may be trained/seeded with information received from a user through a user interface. In other embodiments, the web-crawler may be configured to generate a web query. A web query may include search criteria based on a keyword set. For example, a user may submit a plurality of websites for the web-crawler to search to extract plurality of recipient data 120. In some cases, a web-crawler may be seeded with the entity's website or another selected website, such as reviewing websites, social media websites, promotional websites, and/or the like. The process of seeding a web-crawler refers to the process of providing an initial set of URLs or starting points from which the crawler begins its exploration of the web. These initial URLs are often called seed URLs or a seed set. Seeding may be a curtail step in the web-crawling process as it defines the starting point for discovering and indexing web pages.

With continued reference to FIG. 1, the web-crawler may be programmed with specific search parameters or keyword sets related to various selected recipient profiles 136. For example, if the objective is to create categories for recipient contact data 124 and/or recipient engagement data 128, keywords sets might include information related to the industry or recipient such as an individual recipient's contact data 124 and any related key words for a specific purpose. For example, if recipient is a patron of a restaurant key words may include that patron's internet handle and key words associated with the restaurant, such as "restaurant name," "rating," "other restaurant name (in similar industry)," and/or the like. The web-crawler may start to navigate through web pages, following links and exploring content that matches the defined parameters. It systematically scans websites, professional forums, educational platforms, and other relevant sources. As it browses, the web crawler may extract useful information related to the search parameters. This includes ratings, descriptions of services, mentions of other engagement, and other pertinent data. A web-crawler may be generated by a processor 108.

In further reference to FIG. 1, apparatus 100 may be configured to parse plurality of recipient data 120 into a recipient profile 136. "Parsing" is the process of analyzing a string of symbols, often in the form of text and/or data, to extract meaningful information or to understand its structure. This may include breaking down the data into its components and interpreting their relationship according to specific rules. As used throughout this disclosure, "recipient profile" refers to a data profile associated with a given recipient. Further, a data profile is an analysis of data sets to understand their structure, quality, and relationships. Recipient profile 136 is how the analyzed selected recipient dataset 140 is stored in recipient database 148. Further, recipient profile 136 may be updated by apparatus 100 as described throughout this disclosure in connection with plurality of recipient data 120. Parsing a plurality of recipient data 120 into a recipient profile 136 may include extracting a selected recipient dataset 140 from plurality of recipient data 120, storing selected recipient dataset 140 in a recipient database 148, and verifying selected recipient dataset 140 as a function of recipient contact data 124.

Continuing to reference FIG. 1, in an embodiment, extracting selected recipient dataset 140 may include instantiating a selection machine-learning model 144. Instantiation of selection machine-learning model 144 may include inputting plurality of recipient data 120 and one or more profile parameters; generating, using selection machine-learning model 144 selected recipient dataset 140, and outputting, to database, selected recipient dataset 140. As used throughout this disclosure, "profile parameters" refers to specific attributes that define and characterize a profile within a particular context. For example, and without limitation such as a user profile in an application, a business profile, and/or a technical profile. In an embodiment, one or more profile parameters may include parameters related to recipient contact data 124 and/or recipient engagement data 128. One or more profile parameters may be built into apparatus 100 and/or adjustable based on preference and/or need. For example, and without limitation, profile parameters may always include recipient contact data 124, which may further require name and at least one form of contact, such as phone number, email, and/or the like. Further, recipient engagement data 128 may be adjustable based on an entity's needs and/or preferences. For example, a restaurant may set profile parameters around recipient engagement data 128 that include timestamps, content, and a review of the content. "Selected recipient dataset," as used throughout this disclosure, is a curated collection of data specifically identifying individuals or entities chosen for a particular purpose. For example, and without limitation a recipient may be targeted for marketing campaigns, surveys, and/or other communication efforts. In an embodiment selected recipient dataset 140 may include relevant information about each recipient, such as names, contact details, demographics, and/or preferences. The selection process ensures that selected recipient datasets 140 align with the goals of the initiative, allowing for targeted and effective outreach to the chosen recipient.

Further referencing FIG. 1, instantiating selection machine-learning model 144 may further comprise training selection machine-learning model 144 using exemplary plurality of recipient data 120 and exemplary one or more profile parameters correlated to exemplary selected recipient datasets 140. selection machine-learning model 144 may be trained at computing device 104 and/or remotely. Wherein the latter embodiment may be uploaded to computing device 104. Furthermore, selection machine-learning model 144 may be retrained using outputs of selection machine-learning model 144 iteratively. Retraining of selection machine-learning model 144 may occur at computing device 104 and/or remotely and updated to computing device 104. selection machine-learning model 144 may be trained on general plurality of recipient data 120, one or more profile parameters, and selected recipient datasets 140, and/or on specific data as listed and related to a specific entity. In this instance, general data refers to a bank of data from many sources, not simply a particular entity data source. Alternatively, specific data refers to training selection machine-learning model 144 on data generated and gathered from a specific entity or source.

In further reference to FIG. 1, selection machine-learning model 144 may extract selected recipient dataset 140 using a language processing module. Language processing module may include any hardware and/or software module. Language processing module may be configured to extract, from the plurality of recipient data 120, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above, Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by computing device 104 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory 112 at computing device 104, or the like.

Still referring to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or computing device 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into computing device 104. Documents may be entered into computing device 104 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

In further reference to FIG. 1, in an embodiment extracting selected recipient dataset 140 from plurality of recipient data 120 may include a classifier configured to classify selected recipient dataset 140 into categories. This may include sorting recipient contact data 124 and recipient engagement data 128 into separate categories. These separate categories may include additional subcategories such as, and without limitation, phone number, communication preferences, interaction data, preferred dishes, and/or any other recipient data 120 that may be collected and pertinent to the overall experience of a given recipient. This process may be accomplished using selection machine-learning model 144. In some embodiments, selection machine-learning model 144 may include a classifier that is trained with training data comprising recipient data labeled with categories for the recipient data. In some embodiments, processor 108 may be configured to train a classifier using the training data comprising recipient data labeled with categories for the recipient data. In some cases, this may include supervised learning. Further, selection machine-learning model 144 may utilize clustering algorithms and/or unsupervised learning as discussed in further detail below.

In continued reference to FIG. 1, selection machine-learning model 144 may utilize classifiers in the process of extracting selected recipient dataset 140. A "classifier," as used in this disclosure is a selection machine-learning model 144, such as a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a process whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

In further reference to FIG. 1, selection machine-learning model 144 may utilize a feature learning algorithm to extract selected recipient dataset 140. A "feature learning algorithm," as used herein, is a machine-learning algorithm that identifies associations between elements of data in a data set, which may include without limitation a training data set, where particular outputs and/or inputs are not specified. For instance, and without limitation, a feature learning algorithm may detect co-occurrences of elements of data, as defined above, with each other. As a non-limiting example, feature learning algorithm may detect co-occurrences of elements, as defined above, with each other. Computing device 104 may perform a feature learning algorithm by dividing elements or sets of data into various sub-combinations of such data to create new elements of data and evaluate which elements of data tend to co-occur with which other elements. In an embodiment, first feature learning algorithm may perform clustering of data.

Continuing reference to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of elements of a first type or category with elements of a second type or category, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, computing device 104 may generate a k-means clustering algorithm receiving unclassified data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related data, which may be provided with user cohort labels; this may, for instance, generate an initial set of user cohort labels from an initial set of data, and may also, upon subsequent iterations, identify new clusters to be provided new labels, to which additional data may be classified, or to which previously used data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids $c_i$ of centroids in set C. Unclassified data may be assigned to a cluster based on $argmin_{c_i \ni c} dist(c_i, x)^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $ci=1/|Si|\Sigma xi \ni Si^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected element. Degree of similarity index value may indicate how close a particular combination of elements is to being classified by k-means algorithm to a particular cluster. K-means clustering algorithm may evaluate the distances of the combination of elements to the k-number of clusters output by k-means clustering algorithm. Short distances between an element of data and a cluster may indicate a higher degree of similarity between the element of data and a particular cluster. Longer distances between an element and a cluster may indicate a lower degree of similarity between elements to be compared and/or clustered and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an element and the data entry cluster. Alternatively or additionally k-means clustering algorithm may select a plurality of clusters having low degree of similarity index values to elements to be compared and/or clustered thereto, indicative of greater degrees of similarity. Degree of similarity index values may be compared to a threshold number indicating a minimal degree of relatedness suitable for inclusion of a set of element data in a cluster, where degree of similarity indices a-n falling under the threshold number may be included as indicative of high degrees of relatedness. The above-described illustration of feature learning using k-means clustering is included for illustrative purposes only and should not be construed as limiting potential implementation of feature learning algorithms; persons skilled in the art, upon reviewing the entirety of this disclosure, will be aware of various additional or alternative feature learning approaches that may be used consistently with this disclosure.

With further reference to FIG. 1, parsing plurality of recipient data 120 into a recipient profile 136 includes storing selected recipient dataset 140 in a recipient database 148. A "recipient database," is a collection of organized information relating to recipient profiles that is stored electronically in a computer system. Recipient database 148 may be designed to manage, retrieve, and update data efficiently. In an embodiment, recipient database 148 may include a relational database, wherein the data is organized into tables with defined relationships and/or non-relation (NoSQL), which may use different structures such as documents, key-value pairs, or graphs. Recipient database 148 may be public and/or private. Recipient database 148 may be associated with a particular entity. Alternatively, Recipient database 148 may have no association outside of the framework of the database.

Continuing to reference FIG. 1, parsing plurality of recipient data 120 into a recipient profile 136 may further include verifying selected recipient dataset 140 as a function of recipient contact data 124. Further, verifying selected recipient dataset 140 as a function of recipient contact data 124 may include determining whether the recipient contact data 124 is associated with a particular recipient. For example, this process may determine whether a phone number, name, email and/or internet handle are truly associated with the same recipient. Once a determination is made regarding an individual contact datum, recipient profile 136 may be updated with a verification status and/or the corrected recipient contact data 124. The verification process may include checking recipient contact data 124 against other recipient profiles 136 in recipient database 148, in order to verify whether an association to an existing recipient profile 136 already exists. In an embodiment, wherein recipient contact data 124 is already associated with an existing recipient profile 136 within recipient database 148, apparatus 100 may add to recipient profile 136 instead of creating a new one. This will allow for the updating of profiles, rather than the generation of a new profile each time new plurality of recipient data 120 is received. Verification may be accomplished by generating a similarity score based on similar information. Generating a similarity score involves comparing two or more datasets or items to assess how alike they are. The process of generating a similarity score may include data preparation, such as standardization and/or feature selection, choosing and applying a similarity measure, computing the similarity score, and interpreting the results. Standardization may ensure that data being compared is in a consistent format. For example, text normalization and/or removing duplicates. Whereas feature selection may identify relevant features and/or attributes that may be used to measure similarity. For example, user preferences, and/or product characteristics. Depending on the embodiment of data, a similarity measure may include cosine similarity, Euclidean distance, Jaccard Similarity, and/or Pearson correlation. Computing the similarity score may include applying the chosen measure and normalization, if necessary. Finally, interpreting the results may include thresholding and/or ranking if applicable.

Continuing to reference FIG. 1, in one or more embodiments, verification may be accomplished by using a verification machine-learning model. Instantiation of verification machine-learning model 152 may include inputting recipient contact data 124 and recipient profiles 136 from recipient database 148 into verification machine-learning model, generating, using the verification machine-learning model, a verification code, and outputting to recipient database 148 recipient profile 136 as a function of the verification code. As used throughout this disclosure, "verification code" refers to a communication to computing device 104 as to the presence of an existing recipient profile 136. A verification code that signals that an existing recipient profile 136 associated with contact data 124 contained in plurality of recipient data 120 exists may communicate with computing device 104 to configure processor 108 to update the existing recipient profile 136 with the additional plurality of recipient data 120. Alternatively, a verification code that signals that no recipient profile 136 associated with contact data 124 contained in plurality of recipient data 120 exists may communicate with computing device 104 to configure processor 108 to create a new recipient profile 136. Training of verification machine-learning model 152 may occur at computing device 104 and/or remotely. Exemplary training data may include recipient contact data 124 and recipient profiles 136 from recipient database 148 correlated to similarity scores. Retraining of verification machine-learning model 152 may use outputs of the model iteratively and may occur at computing device 104 and/or remotely.

In further reference to FIG. 1, verification may additionally include verifying contact data 124. This verification embodiment may include determining whether a phone number, Email, username, and/or the like is in service or in operation. Determining whether contact data 124 is valid may include verifying suitable format configurations. This may be accomplished by performing length checks, format checks, such as number format checks, and/or by interfacing with an application programming interface (API), wherein the API will return whether or not contact data 124 is valid. Checking for valid number format may be a verification of suitable format configurations. In an embodiment, this may include implementing a system such as, but without limitation, JavaScript. This may be accomplished by utilizing the JavaScript function to clear out any spacer characters, checking if the phone number contains only numbers, and that the sting of numbers corresponds to the correct amount of characters associated with a phone number. In an embodiment, an API may return whether or not contact data 124 is valid by sending a message and/or phone call to the contact data 124 to confirm its operation. For example, API may send a message to recipient wherein the message contains, "reply '1' to verify this number." Messages may be electronic, audio, text, and/or the like. Further, verification may be accomplished by one or a combination of methods such as a line test, Turing test, line test and authentication, database checks, and or other methods associated with verification. A line test is accomplished by making an aborted call to a recipient. This automated system may listen to check for ringback tones, busy signals, answered calls, voice mail automated answering, and/or network operator injected messages such as "the number dialed is no longer in service." The Turing test may employ such methods further and verify that an actual person answers the phone call by insisting that the recipient, "press one to (un)subscribe." This may provide data on active contact data. A similar method may be applied to any other contact data such as emails, usernames, and/or the like. A line test and authentication may include supplying a recipient via a communication channel with an authentication code, the recipient may then be contacted via another communication channel and asked for the authentication code. A database check may utilize global databases and check contact data against already tested and confirmed contact data. Other methods of verification may include sending an OTP via SMS or IVR call, soft tokens within a recipient's external system 132, and/or push messages. Additionally, in an embodiment, verification may include determining whether a phone number is a landline or a phone enabled to receive text communications.

Continuing to reference FIG. 1, each level of verification may be recorded in recipient database 148 in the corresponding recipient profile 136. Should contact data 124 fail verification it may be deleted from recipient profile 136. In an embodiment, contact data 124 that has failed one or more verification steps may be stored separately within recipient database 148. This may allow for future efficiency in verifying contact data 124. Further, contact data 124 that has failed verification may be updated by random verification checks and when run with new plurality of recipient data 120. In another embodiment, contact data 124 that has failed verification may be stored in a separate database, either locally and/or remotely.

With continued reference to FIG. 1, apparatus 100 is configured to determine a communication channel configuration 156 for recipient profile 136. As used throughout this disclosure, "communication channel configuration" to a set of one or more parameters relating to a communication channel. This may include various types of communication channels including wired, wireless, and/or network connections. Communication channel configuration 156 may include subsets of configurations such as: channel type, protocol settings, bandwidth, frequency ad modulation, security settings, quality of service (QoS), network addressing, error handling, connection management, monitoring and diagnostics, preferred communication methods, preferred and/or optimal contact times, and/or the like. Channel type may specify the type of communication medium and/or communication channel 160 used. For example, and without limitation communication medium may include ethernet, wi-fi, Bluetooth, and/or the like. Whereas communication channel 160 may include electronic communication, call forwarding, short message services (SMS), and/or the like. Protocol settings may include rules and conventions for data transmission and may include protocols such as TCP/IP, HTTP, FTP, and/or MQTT. Bandwidth may determine the data transfer capacity of the channel, affecting how much information may be sent and received in a given timeframe. Frequency and modulation may be considered in wireless communications and may include the frequency band used and the modulation techniques that affect signal quality and range. For example, and without limitation AM, FM and/or QAM. Security settings may be configured in relation to encryption, authentication, and/or authorization to ensure data privacy and integrity during transmission. QoS includes settings that prioritize certain types of traffic to ensure performance standards, particularly for time-sensitive data like voice and/or video. Network addressing involves assigning IP addresses and subnet masks that facilitate routing and communication between devices on a network. Error handling may include mechanisms for detecting and/or correcting errors in transmitted data, such as checksums and/or acknowledgement protocols. Connection management may include settings that define how connections are established, maintained, and/or terminated. For example, and without limitation, this may include timeout settings and/or session management. Monitoring and diagnostics may include tools and/or settings for tracking the performance of health of communication channels, which may enable troubleshooting and/or optimization.

In further reference to FIG. 1, determining communication channel configuration 156 for recipient profile 136 may include querying, using a communication channel 160, one or more recipient systems 164 associated with recipient profile 136. As used throughout this disclosure, "communication channel" is a medium through which information is transmitted from one party to another. In an embodiment, communication channel 160 may utilize wired channels, wireless channels, digital channels, analog channels, interpersonal channels, and/or mass communication channels. For example, and without limitation communication channel 160 may include email, direct messaging, SMS, call forwarding, and/or the like. In an embodiment, recipient systems 164 may include any system discussed throughout this disclosure associated with a recipient. Recipient systems 164 may include one or more systems, such as devices, software programs, and/or the like. For example, and without limitation, recipient systems 164 may include POS systems, accounting systems, delivery systems, and/or any other systems associated with recipient. In an embodiment, communication channel 160 may include one or a combination of SMS, call forwarding, and/or email forwarding. In some embodiments, querying may occur by apparatus 100 generating a message for a recipient, wherein the message is constructed to invite the recipient to opt-in to communications. The message may be sent via any communication channel 160 as discussed above. For example, and without limitation this may include SMS, MMS, RCS, iMessage, signal, telegram, gchat, and/or the like. Additionally, in some embodiments the message may be audio and/or video, which may be played for a recipient. For example, and without limitation, apparatus 100 may play an opt-in solicitation audio message to the recipient.

In further reference to FIG. 1, in an embodiment, apparatus 100 may further be configured to select an optimal communication channel as a function of communication channel configuration 156, generate a communication signal 168 as a function of the recipient profile, and transmit a communication signal 168 using the optimal communication channel. In some embodiments, optimal communication channel may be chosen as a function of a communication channel configuration for a particular profile. Further, wherein the optimal communication channel is selected from a list including a cellular network communication, an electronic communication, and/or a telephonic communication. "Optimal," as used in this instance refers to a best fit provided for by the selected recipient dataset. Optimization may be accomplished by utilizing channel configuration machine-learning model 176 as described in further detail below. A "communication signal" is a physical representation of information that is transmitted from apparatus 100 to recipient system 164. Communication signal 168 may be embodied in the form of text, image and/or sound recording, other data, and/or the like.

Further referencing FIG. 1, as used throughout this disclosure, "cellular network communication" is a technology that enables a plurality of wireless end nodes communicate with one another and the internet using a network of fixed-location transceivers. In an embodiment, cellular network communication may include data packets transmitted over a cellular network. For example, and without limitation this may include SMS, MMS, RCS, and/or iMessage. SMS may be transmitted as text over a cellular network using a store-and-forward method. When a user sends an SMS, it may go to a SMS Center (SMSC), which stores the message temporarily and forwards it to the recipient's system 164. Alternatively, multimedia messaging service (MMS) allows users to send multimedia content, such as images, audio, and/or video. When an MMS is sent, the message is sent to an MMS server, which then delivers it to the recipient's system 164. Multimedia files are typically larger than SMS can handle. Rich Communication Services (RCS) includes additional features relative to SMS and MMS that allows features such as group chats, read receipts, and/or high-resolution media sharing. RCS messages may be sent over the internet rather than traditional SMS routes, using data connections and/or Wi-Fi. iMessage is Apple's messaging service that allows users to send text, photos, videos, and more over Wi-Fi and/or cellular data. When sending an iMessage, it uses the internet rather than the cellular network's SMS/MMS infrastructure.

With continued reference to FIG. 1, "electronic communication" refers to the exchange of information using electronic devices and technology. This may include various methods and platforms that enable the transmission of messages, data, and/or multimedia content over electronic means. For example, and without limitation, this may include email, instant messaging, social media, video conferencing, and/or the like. "Telephonic communication," as used throughout this disclosure, refers to the exchange of information through voice over telephone systems. In some embodiments, telephonic communication may use cellular networks as described above, such as when a call is placed to or from a cell phone. Telephonic communication enables two or more parties to converse in real-time, regardless of their physical location. This may include landline and/or mobile telephonic communication. Further, telephonic communication may include one-on-one communication, conference calls, and/or voicemail services.

Still referring to FIG. 1, determining communication channel configuration 156 for recipient profile 136 may further include receiving a response signal 172 using communication channel 160. As used throughout this disclosure, "response signal" is a physical quality that conveys information from recipient system 164 to apparatus 100. Response signal 172 may be embodied in the form of text, image and/or sound recording, other data, and/or the like. Response signal 172 may be communicated via the same communication channel 160 as used in the querying phase of determination, and/or via a different communication channel 160. In an embodiment including an audio message, apparatus 100 may be configured to receive response signal 172 in the form of an opt-in input. For example, and without limitation response signal 172 may include input such as press 1 for "yes," press 2 for "no." Additionally, response signal 172 may be verbal, such as "yes," or "no."

Further referencing FIG. 1, determining communication channel configuration 156 for recipient profile 136 may further include updating communication channel configuration 156 of recipient profile 136 as a function of response signal 172. In one or more embodiments, updating communication channel configuration 156 may be accomplished by processing response signal 172 at channel configuration machine-learning model 176. This may require training of channel configuration machine-learning model 176 with training data including exemplary communication signals 168, exemplary response signals 172, and each of their associated metadata correlated with exemplary updated communication configurations and recipient profiles 136. In some embodiments, channel configuration model 176 may be trained using training data comprising exemplary selected recipient datasets correlated to exemplary communication channel configuration data. In some embodiments, channel configuration model 176 may be trained using training data comprising exemplary recipient profiles correlated to exemplary communication channel configuration data. Channel configuration machine-learning model 176 may be iteratively retrained using outputs of the model and updated at and/or remotely to computing device 104.

In continued reference to FIG. 1, in an embodiment, determining communication channel configuration 156 for recipient profile 136 may further include configuring a communication channel of external system 132 to forward a telephonic communication to at least a processor 108, wherein the telephonic communication includes at least associated metadata, and parsing metadata of telephonic communication for the plurality of recipient data 120. In some embodiments, determining communication channel configuration 156 for recipient profile 136 may further include forwarding the telephonic communication back to a hunt group. As used in this disclosure, "telephonic communication" refers to a communication signal that is transmitted over a telephonic network. Telephonic communication may include phone calls, SMS, and/or the like. Exchanged information may include text, video, and/or sound information. A "hunt group" is a telecommunications feature that allows incoming calls to be distributed among a group of phone lines and/or extensions in a predefined order. Hunt groups may have a certain call distribution configuration. For example, hunt group call distribution configurations may include sequential hunt, circular hunt, and/or simultaneous hunt. A sequential hunt configuration will direct calls to each member of the group one after another until answered. Alternatively, A circular hunt configuration may send calls to the next available member in a circular manner, looping back to the first member after reaching the last. Further, a simultaneous hunt configuration may reach all members of the group, wherein each member of the group receives the call at the same time, allowing anyone who is available to pick up.

Further referencing FIG. 1, in an embodiment, determining communication channel configuration 156 for recipient profile 136 may further include configuring a communication channel of external system 132 to forward electronic communication signal to at least a processor 108, wherein the electronic communication signal includes metadata, parsing the metadata of the electronic communication signal 168 for plurality of recipient data 120. As used throughout this disclosure, "electronic communication signal" is a communication signal that is transmitted over the internet. For example, electronic communication signals may include email. Metadata of the electronic communication signal may include, but is not limited to information included in email headers, such as the recipient's email address, the sender's email address, addresses of recipients who receive a copy of the email, addresses of recipients who receive a blind copy of the email, subject line of the email, the date and time the email was sent, the date and time the email was received, message-ID, reply-to addresses, return-path addresses, content-type of the email, received headers, X-headers, and/or the like. Received headers may include a list of servers that processed the email as it traveled from sender to recipient and may further include timestamps. X-headers are custom headers added by email clients and/or services. Not all metadata gathered from electronic communication signal may be useful. However, certain embodiments of metadata may be utilized in channel configuration of recipient profile 136. For example, metadata including recipient's email address, any forwarding addresses, and timestamps may be quite important in determining channel configuration of recipient profile 136.

In continued reference to FIG. 1, in an embodiment determining communication channel configuration 156 for recipient profile 136 may further include configuring a communication channel of external system 132 to forward a telephonic communication to at least a processor 108, wherein the telephonic communication includes at least associated metadata, playing an audio message to the recipient, and parsing the metadata of the telephonic communication and response signal 172 for plurality of recipient data 120. Metadata associated with telephonic communication may include caller ID, recipient ID, date and time, call duration, call type (incoming/outgoing/missed), call status, location data, network information, call transfer data, device information, recording status, service provider information, and/or the like. Metadata important to discerning channel configuration may include recipient ID, date and time, location data, and date and time. In such an embodiment, apparatus 100 may utilize automatic speech recognition. to verify an opt-in status and/or contact data 124 verification status as discussed above in relation to verifying contact data 124.

Still referring to FIG. 1, in some embodiments, automatic speech recognition may require training (i.e., enrollment). In some cases, training an automatic speech recognition model may require an individual speaker to read text or isolated vocabulary. In some cases, a solicitation video may include an audio component having an audible verbal content, the contents of which are known a priori by computing device 104. Computing device 104 may then train an automatic speech recognition model according to training data 148 which includes audible verbal content correlated to known content. In this way, computing device 104 may analyze a person's specific voice and train an automatic speech recognition model to the person's speech, resulting in increased accuracy. Alternatively or additionally, in some cases, computing device 104 may include an automatic speech recognition model that is speaker independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, computing device 104 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within solicitation video, but others may speak as well.

Still referring to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis, or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data 148; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content) speeds. In some cases, DTW may allow computing device 104 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 4 and 5. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases. neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

Figure 2:
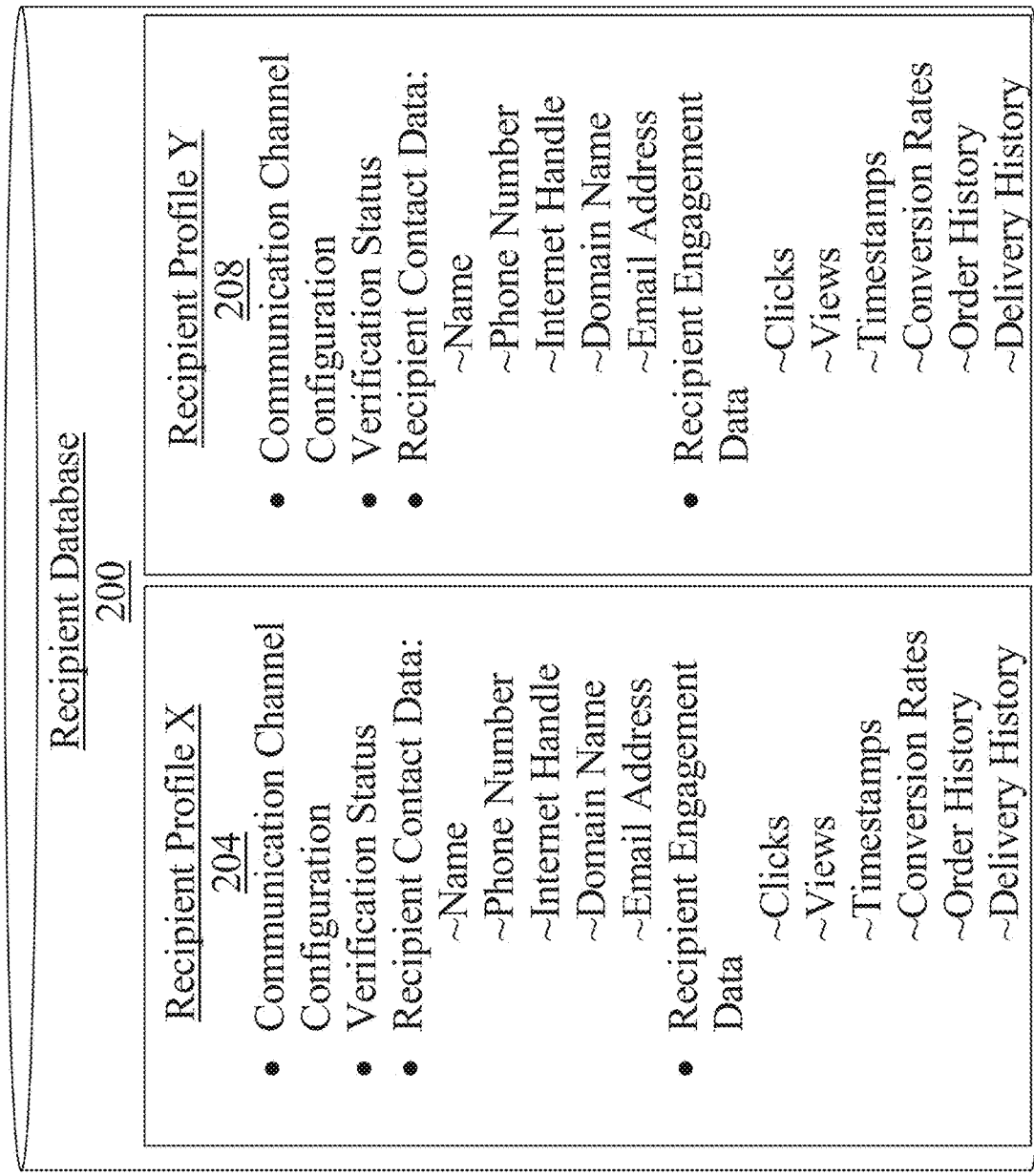
FIG. 2 is a diagram of an exemplary embodiment of a recipient database.

Now referring to FIG. 2, an exemplary recipient database 200 is shown. Illustrated are two exemplary recipient profiles, recipient profile X 204 and recipient profile Y 208, stored in recipient database 200. Recipient database 200 may store a plurality of recipient profiles, such as 204 and 208, which may be accessed to update and or be utilized in any method and/or process as described here within. Recipient database 200 illustrates exemplary embodiments of recipient profile X 204 and recipient profile Y 208, which may contain communication channel configurations 156, verification statuses, recipient contact data, and/or recipient engagement data.

Figure 3:
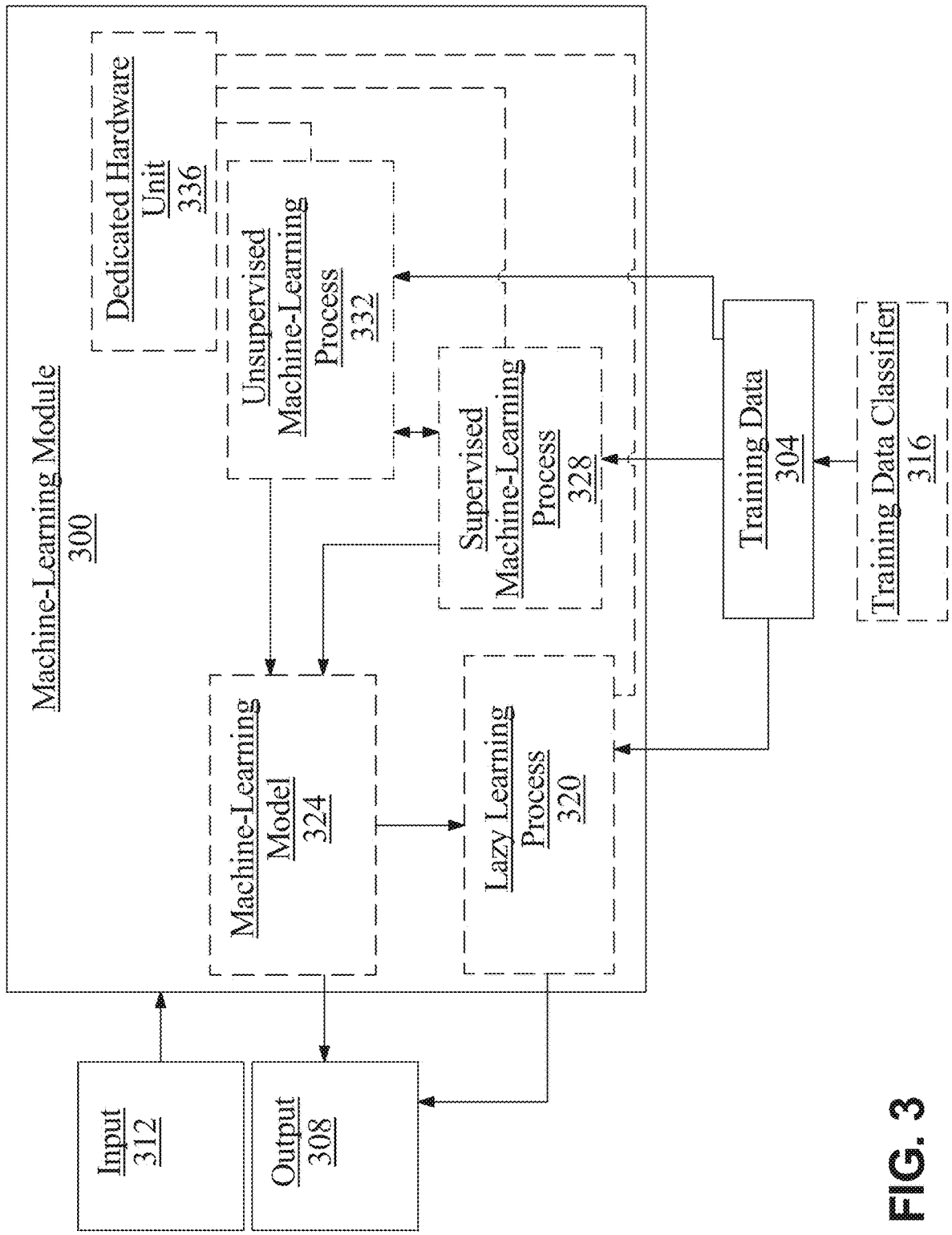
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine-learning processes. A "machine-learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine-learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include exemplary plurality of recipient data and exemplary one or more profile parameters correlated to outputs of exemplary selected recipient datasets.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to sort plurality of recipient data into contact data and engagement data.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine-learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine-learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine-learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine-learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Antialiasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images. Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory 112; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, and outputs described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine-learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
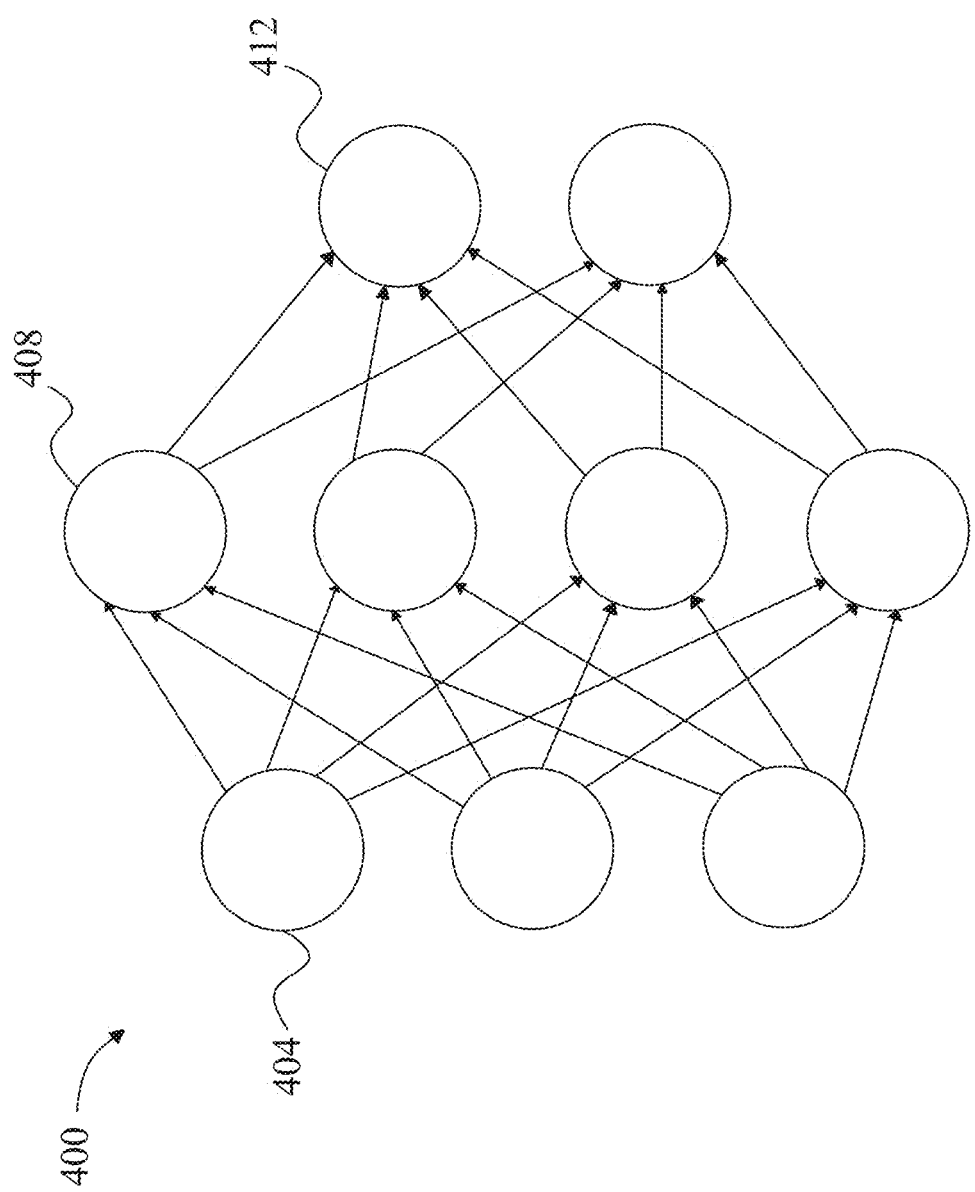
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
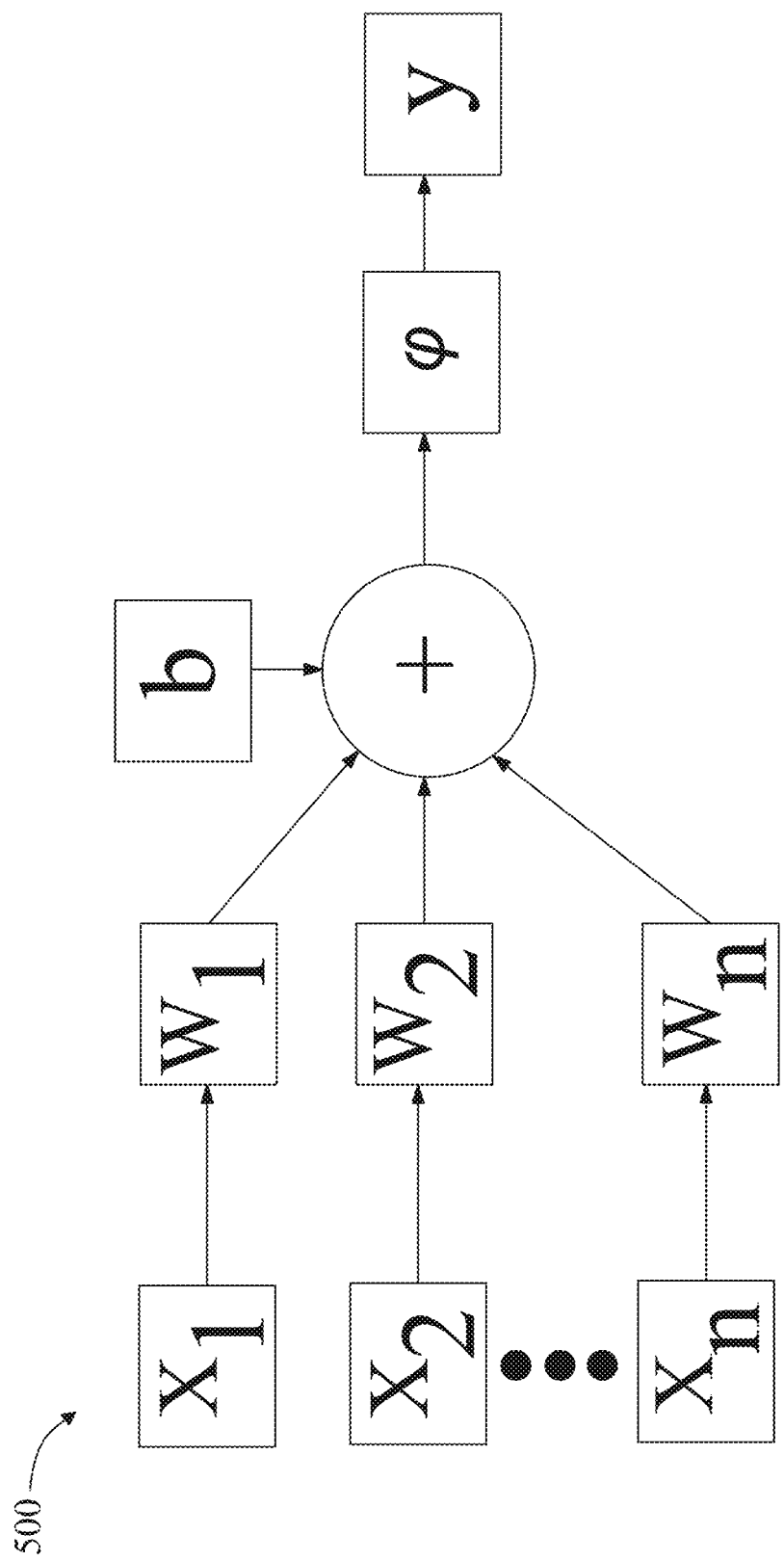
FIG. 5 is a diagram of an exemplary embodiment of a node of a neural network.

Referring now to FIG. 5, an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
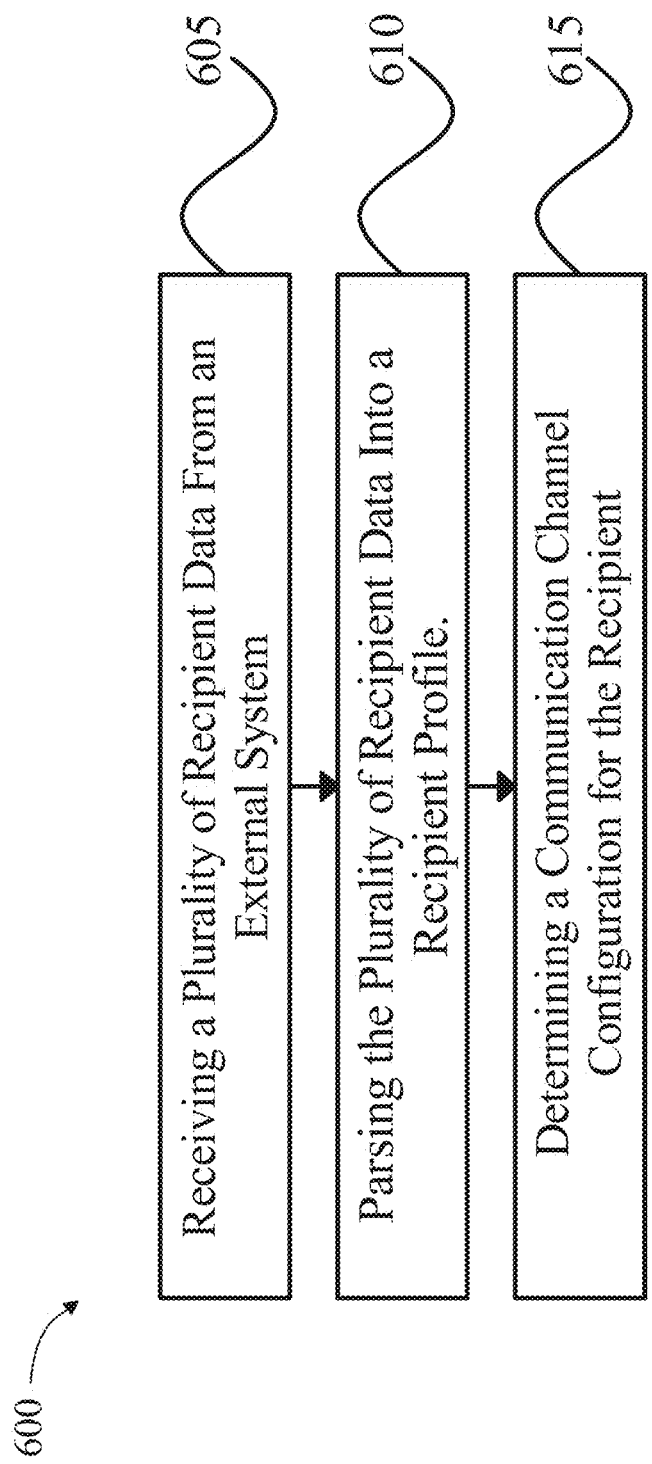
FIG. 6 is a flow diagram illustrating a method of communication channel configuration.

Now referring to FIG. 6, an embodiment of a method for communication channel configuration is illustrated. In an embodiment, method 600 may include receiving a plurality of recipient data from an external system 605, parsing the plurality of recipient data into a recipient profile 610, and determining a communication channel configuration for the recipient profile 615. Parsing the plurality of recipient data into a recipient profile 610 may further include extracting a chosen recipient dataset from the plurality of recipient data, storing the selected recipient dataset in a recipient database, and verifying the recipient data as a function of recipient contact data. Additionally, determining a communication channel configuration for the recipient profile 615 may further include querying, using a communication channel, one or more recipient systems associated with the recipient profile, receiving a response signal using the communication forum, and updating the communication channel configuration of the recipient profile as a function of the response signal. This may be accomplished as described with reference to FIGS. 1-5.

With continued reference to FIG. 6, in an embodiment, method 600 may further include selecting an optimal communication channel as a function of the communication channel configuration, generating a communication signal as a function of the recipient profile, and transmitting the communication signal using the optimal communication channel. This may be accomplished as described with reference to FIGS. 1-5.

Still referring to FIG. 6, in an embodiment, receiving plurality of recipient data from the external system may further include receiving plurality of recipient data using a web-crawler. This may be accomplished as described with reference to FIGS. 1-5.

In further reference to FIG. 6, in an embodiment, extracting the selected recipient dataset may further include instantiating a machine-learning model. Instantiating a machine-learning model may include inputting he plurality of recipient data and one or more profile parameters into the machine-learning model, generating, at the machine-learning model, the selected recipient dataset, and outputting, to the recipient database, the selected recipient dataset. Instantiating a machine-learning model may further include training the machine-learning model using exemplary plurality of recipient data and exemplary one or more profile parameters correlated to exemplary selected recipient datasets. This may be accomplished as described with reference to FIGS. 1-5.

Continuing to reference FIG. 6, in an embodiment, determining the communication channel configuration for the recipient profile may further include configuring a communication channel of the external system to forward a telephonic communication to the at least a processor, wherein the telephonic communication includes at least metadata, parsing the metadata of the telephonic communication for the plurality of recipient data, and forwarding the telephonic communication back to a hunt group. This may be accomplished as described with reference to FIGS. 1-5.

In further reference to FIG. 6, in an embodiment, determining the communication channel configuration for the recipient profile may further include configuring a communication channel of the external system to forward a telephonic communication to the at least a processor, wherein the telephonic communication includes at least metadata, playing an audio message to a recipient, and parsing the metadata of the telephonic communication and the response signal for the plurality of recipient data. This may be accomplished as described with reference to FIGS. 1-5.

Still referring to FIG. 6, in an embodiment, determining the communication channel configuration for the recipient profile may further include configuring a communication channel of the external system to forward an electronic communication signal to the at least a processor, wherein the electronic communication signal includes at least metadata, and parsing the metadata of the electronic communication signal for the plurality of recipient data. This may be accomplished as described with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
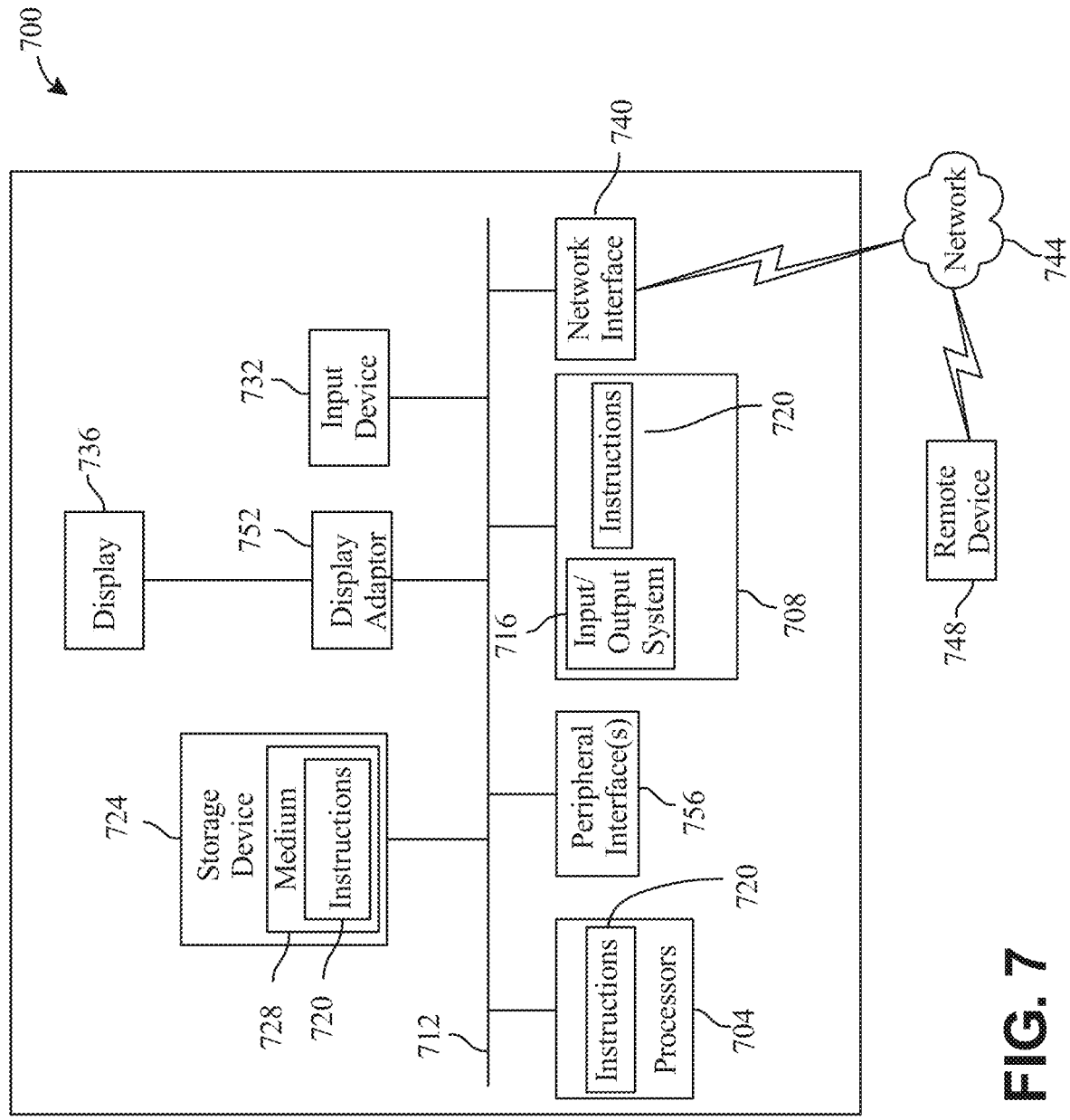
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for communication channel configuration, wherein the apparatus comprises:
    at least a processor; and
    a memory communicatively connected to the at least a processor, wherein the memory contains instructions configuring the processor to:
        receive a plurality of recipient data from an external system;
        parse the plurality of recipient data into a recipient profile, wherein parsing the plurality of recipient data comprises:
            extracting a selected recipient dataset from the plurality of recipient data;
            storing the selected recipient dataset in a recipient database; and
            verifying the selected recipient dataset as a function of recipient contact data; and
        determine a communication channel configuration for the recipient profile, wherein determining the communication channel configuration comprises:
            querying, using a communication channel, one or more recipient systems associated with the recipient profile;
            receiving a response signal using the communication channel; and
            updating the communication channel configuration of the recipient profile as a function of the response signal.

2. The apparatus of claim 1, wherein the memory contains instructions further configuring the at least a processor to:
    select an optimal communication channel as a function of the communication channel configuration, wherein the optimal communication channel is selected from a list comprising a cellular network communication, an electronic communication, and a telephonic communication;
    generate a communication signal as a function of the recipient profile; and
    transmit the communication signal using the optimal communication channel.

3. The apparatus of claim 1, wherein receiving the plurality of recipient data from an external system comprises querying the external system for records from a selected temporal interval.

4. The apparatus of claim 1, wherein receiving the plurality of recipient data from the external system further comprises receiving the plurality of recipient data using a web-crawler.

5. The apparatus of claim 1, wherein the selected recipient dataset comprises recipient contact data and recipient interaction data.

6. The apparatus of claim 1, wherein extracting the selected recipient dataset further comprises instantiating a machine-learning model comprising:
    inputting the plurality of recipient data and one or more profile parameters into the machine-learning model;
    generating, using the machine-learning model, the selected recipient dataset; and
    outputting, to the recipient database, the selected recipient dataset.

7. The apparatus of claim 6, wherein instantiating the machine-learning model further comprises training the machine-learning model using exemplary plurality of recipient data and exemplary one or more profile parameters correlated to exemplary selected recipient datasets.

8. The apparatus of claim 1, wherein determining the communication channel configuration for the recipient profile further comprises:
    configuring a communication channel of the external system to forward a telephonic communication to the at least a processor, wherein the telephonic communication comprises metadata;
    parsing the metadata of the telephonic communication for the plurality of recipient data; and
    forwarding the telephonic communication back to a hunt group.

9. The apparatus of claim 1, wherein determining the communication channel configuration for the recipient profile further comprises:
    configuring a communication channel of the external system to forward a telephonic communication to the at least a processor, wherein the telephonic communication comprises metadata; and
    parsing the metadata of the telephonic communication and the response signal for the plurality of recipient data.

10. The apparatus of claim 1, wherein determining the communication channel configuration for the recipient profile further comprises:
    configuring a communication channel of the external system to forward an electronic communication signal to the at least a processor, wherein the electronic communication signal comprises metadata; and
    parsing the metadata of the electronic communication signal for the plurality of recipient data.

11. A method for communication channel configuration, wherein the method comprises:
    receiving a plurality of recipient data from an external system;
    parsing the plurality of recipient data into a recipient profile, wherein parsing the plurality of recipient data comprises:
        extracting a selected recipient dataset from the plurality of recipient data;
        storing the selected recipient dataset in a recipient database; and
        verifying the selected recipient dataset as a function of recipient contact data; and
    determining a communication channel configuration for the recipient profile, wherein determining the communication channel configuration comprises:
        querying, using a communication channel, one or more recipient systems associated with the recipient profile;
        receiving a response signal using the communication channel; and
        updating the communication channel configuration of the recipient profile as a function of the response signal.

12. The method of claim 11, further comprising:
    selecting, by the at least a processor, an optimal communication channel as a function of the communication channel configuration, wherein the optimal communication channel is selected from a list comprising a cellular network communication, an electronic communication, and a telephonic communication;

generating a communication signal as a function of the recipient profile; and transmitting the communication signal using the optimal communication channel.

13. The method of claim 11, wherein receiving the plurality of recipient data from an external system comprises querying the external system for records from a selected temporal interval.

14. The method of claim 11, wherein receiving the plurality of recipient data from the external system further comprises receiving the plurality of recipient data obtained using a web-crawler.

15. The method of claim 11, wherein the selected recipient dataset comprises recipient contact data and recipient interaction data.

16. The method of claim 11, wherein extracting he selected recipient dataset further comprises instantiating a machine-learning model comprising: inputting the plurality of recipient data and one or more profile parameters into the machine-learning model; generating, using the machine-learning model, the selected recipient dataset; and outputting, to the recipient database, the selected recipient dataset.

17. The method of claim 16, wherein instantiating the machine-learning model further comprises training the machine-learning model using exemplary plurality of recipient data and exemplary one or more profile parameters correlated to exemplary selected recipient datasets.

18. The method of claim 11, wherein determining the communication channel configuration for the recipient profile further comprises:

configuring a communication channel of the external system to forward a telephonic communication to at least a processor, wherein the telephonic communication comprises metadata;

parsing the metadata of the telephonic communication for the plurality of recipient data; and forwarding the telephonic communication back to a hunt group.

19. The method of claim 11, wherein determining the communication channel configuration for the recipient profile further comprises:

configuring a communication channel of the external system to forward a telephonic communication to at least a processor, wherein the telephonic communication comprises metadata; and parsing the metadata of the telephonic communication and the response signal for the plurality of recipient data.

20. The method of claim 11, wherein determining the communication channel configuration for the recipient profile further comprises:

configuring a communication channel of the external system to forward an electronic communication signal to at least a processor, wherein the electronic communication signal comprises metadata; and parsing the metadata of the electronic communication signal for the plurality of recipient data.

* * * * *